United States Patent [19]

Unger et al.

[11] 3,811,007

[45] May 14, 1974

[54] FACSIMILE METHOD AND APPARATUS

[75] Inventors: Peter J. Unger, Beaverton; Harry L. Ford, Portland, both of Oreg.

[73] Assignee: Tektronix, Inc., Beaverton, Oreg.

[22] Filed: Nov. 11, 1971

[21] Appl. No.: 197,772

[52] U.S. Cl. ....... 178/6.6 A, 178/6.7 R, 178/DIG. 3

[51] Int. Cl. ........................................ H04n 1/22

[58] Field of Search ....... 178/DIG. 3, 6.6 A, 6.6 FS, 178/6.7, 6.8

[56] References Cited

UNITED STATES PATENTS

| | | | |
|---|---|---|---|
| 3,725,575 | 3/1973 | Dell | 178/6.7 R |
| 3,284,567 | 11/1966 | Southworth | 178/DIG. 3 |
| 3,564,127 | 2/1971 | Sziklai | 178/6.6 FS |
| 3,679,824 | 7/1972 | Gibson | 178/6.6 A |

*Primary Examiner*—James W. Moffitt
*Attorney, Agent, or Firm*—Klarquist, Sparkman, Campbell, Leigh, Hall & Whinston

[57] ABSTRACT

A hard copy of a refreshed computer terminal cathode ray tube display raster is produced on light sensitive paper by scanning the moving paper in the direction of paper movement employing a second cathode ray tube. Scans in the direction of paper movement are short and represent aligned segments of the original raster, this information being received at the scanning rate of a first tube and stored for readout onto the sensitive paper at a slower rate between reception of the aforementioned segments.

13 Claims, 10 Drawing Figures

FACSIMILE METHOD AND APPARATUS

BACKGROUND OF THE INVENTION

The option of providing a permanent "hard copy" output of selected information from a cathode ray tube display is clearly desirable as in the case of information received at a computer terminal. Of course, one may photograph the conventional cathode ray tube presentation in order to provide a permanent copy thereof, but this procedure is time-consuming and unnecessarily expensive in most instances, and does not always provide the desired quality or size of reproduction.

Hard copy units have been employed heretofore utilizing long, narrow faceplate copying tubes for scanning a sensitized moving web in a first or horizontal direction while the web is transported past the fiber optic faceplate of the copying tube in a second direction. With conventional "refreshed" terminal displays, this often means exposing the web to one horizontal scanning line during each raster field presentation on the refreshed tube. The scanning line itself does not illuminate much of the web and the intensity of illumination of the copying tube must be high.

Scanning the web in the direction of its movement is believed to be of advantage since more of the web can be exposed and the web can be exposed at a higher rate. In such instance, short segments of raster lines scan crossways of the copying tube faceplate, i.e., across its short dimension as illustrated in FIG. 2. Two difficulties are ordinarily encountered, however. First a high level of brightness is required of the copying tube as its electron beam scans across the short dimension of its faceplate at a very high rate to produce a raster line segment, and is then blanked for a comparatively long time corresponding to the non-utilized part of the same raster line. Second, the Z-axis of the copying tube must be modulated at the video rate of the display, typically about 10 megahertz. This combination of high brightness and Z-axis band width is difficult to achieve, for example in a fiber optic faceplate cathode ray copying tube.

SUMMARY OF THE INVENTION

According to the present invention, information is received at a given rate from a computer terminal or the like and first portions thereof are stored, wherein such portions are separated by longer portions therebetween. For instance, information corresponding to short raster line segments is stored and the remainder of the information between these segments is passed over. The cathode ray tube then scans an image-receiving surface or web at a slower rate for displaying the previously stored information. In a particular example, copying tube scanning takes place during the comparatively long interim period when the unused information is received.

In a preferred embodiment, the sensitized web is scanned with aligned raster line segments, and after aligned segments across substantially the complete raster have been presented, next segments are scanned at displaced locations along the raster generally providing an overlapping relation with the first mentioned segments. Meanwhile, the web moves at a rate related to the degree of overlap for providing a composite image of the input information.

In accordance with a particular embodiment, raster line segments are digitized and stored in a small memory device such as a shift register. Then during the relatively long period of time representing the temporarily unused portion of the raster line, the information is removed from the register at a slower rate, amplified, and applied to the Z-axis of the copying tube for exposing the sensitized web. The requirements for brightness and band width are reduced in this system to easily manageable proportions.

To obtain gray scale capability, the above system is expanded by digitizing input amplitudes and applying the digitized quantities to a number of shift registers. Each stored bit, depending upon the register in which it was stored, is used to generate a pulse of appropriate amplitude for application to the tube's Z-axis circuitry.

It is accordingly an object of the present invention to provide an improved method and apparatus for supplying a hard copy of input information.

It is another object of the present invention to provide an improved method and apparatus for supplying a hard copy of information displayed on a refreshed CRT display.

It is another object of the present invention to provide an improved method and apparatus for supplying a hard copy of input information wherein requirements of brightness and high band width in the readout equipment are alleviated.

It is a further object of the present invention to provide an improved digital method and apparatus for supplying a hard copy of information from a refreshed computer terminal, wherein the hard copy is rapidly and economically produced, with high reproduction quality.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
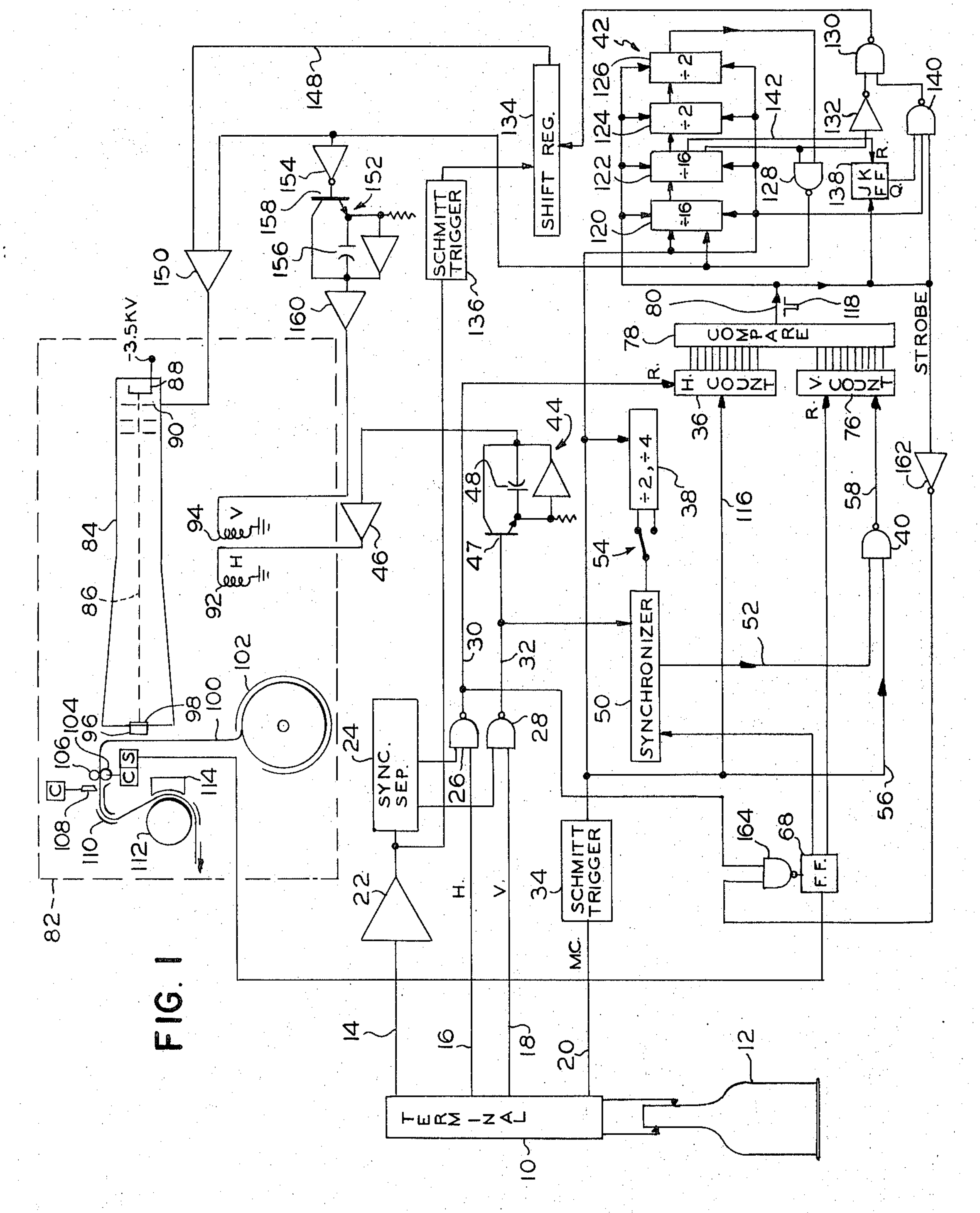
FIG. 1 is a block diagram of a circuit according to the present invention.

Referring to the drawings and particularly to FIG. 1, the apparatus according to the present invention is adapted to provide substantially permanent copy on sensitive paper web 100 of information received from terminal 10 or similar input device. Terminal 10 is typically a computer terminal coupled to a remote computer via telephone circuitry (not shown) for providing a visual output upon cathode ray tube 12. Cathode ray tube 12 is usually operated in a "refresh" mode, that is, wherein terminal 10 supplies repeated information in the form of a raster scan which is viewed on the face of tube 12 by the terminal user. The same information is conveniently provided to circuitry in accordance with the present invention by way of Z-axis video output lead 14, horizontal sync output lead 16, vertical sync output lead 18 and master clock output lead 20. The master clock frequency is a multiple of the vertical and horizontal sync frequencies and in a particular instance was approximately 9.83 megahertz, it being understood the "refresh" operation of the terminal including horizontal and vertical sync pulses are synchronized therewith.

The video or Z-axis output on lead 14 is supplied to input amplifier 22 which drives sync stripper and separator circuit 24 wherein the horizontal and vertical synchronization information is removed from the video signal in case the same is not separately provided on leads 16 and 18. In combination with the leads 16 and 18, horizontal and vertical sync outputs respectively of sync stripper and separator 24 are applied to nand-gates 26 and 28 whereby the horizontal and vertical synchronization pulses appear on leads 30 and 32. The master clock signal is squared in Schmitt trigger 34, and the output thereof is coupled to horizontal counter 36, dividing circuit 38, nand-gate 40, and as an input as well as a synchronizing clock to synchronous counter 42. The vertical sync pulses on lead 32 are applied to Miller integrator circuit 44 which provides a ramp output via amplifier 46 to horizontal deflection coil 92 of processor 82 between occurrences of vertical sync pulses. Thus, each time a vertical sync pulse occurs, transistor 47 conducts in response thereto, shunting integrating feedback capacitor 48 of the Miller integrator. At the conclusion of such vertical sync pulse, transistor 47 ceases to conduct and the Miller circuit 44 supplies the ramp output causing deflection in the horizontal direction for electron beam 86 of cathode ray tube 84, i.e., in a direction perpendicular to the drawing. The vertical sync signal on lead 32, applied to synchronizer 50, functions to resynchronize the vertical sync pulses with the master clock at nand-gate 40, but nand-gate 40 is operated by the synchronizer via lead 52 for only the duration of selected master clock pulses. The dividing circuit 38 comprising a two stage counter, outputs of which are selected using switch 54, provides an additional input for synchronizer 50 in a manner hereinafter more fully discussed in connection with FIG. 6. Synchronizer 50 is "set" on a vertical sync pulse and a master clock pulse, and reset on the next master clock pulse received from switch 54. Consequently, the output from the synchronizer 50 on lead 52 will be "up" for the duration of two or four master clock pulses, according to the setting of switch 54, and the selected number of two or four master clock pulses will produce negative-going outputs at lead 58. This action is more fully explained with respect to the waveform chart of FIG. 7 wherein the waveforms are plotted with respect to time.

Figure 6:
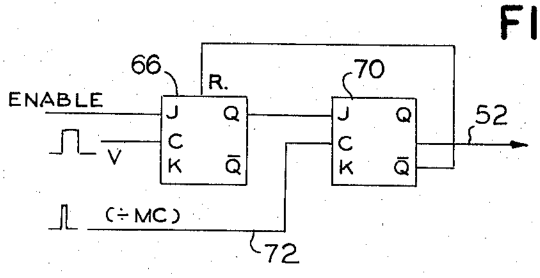
FIG. 6 is a block diagram further expanding upon a portion of the FIG. 1 circuit.
Figure 7:
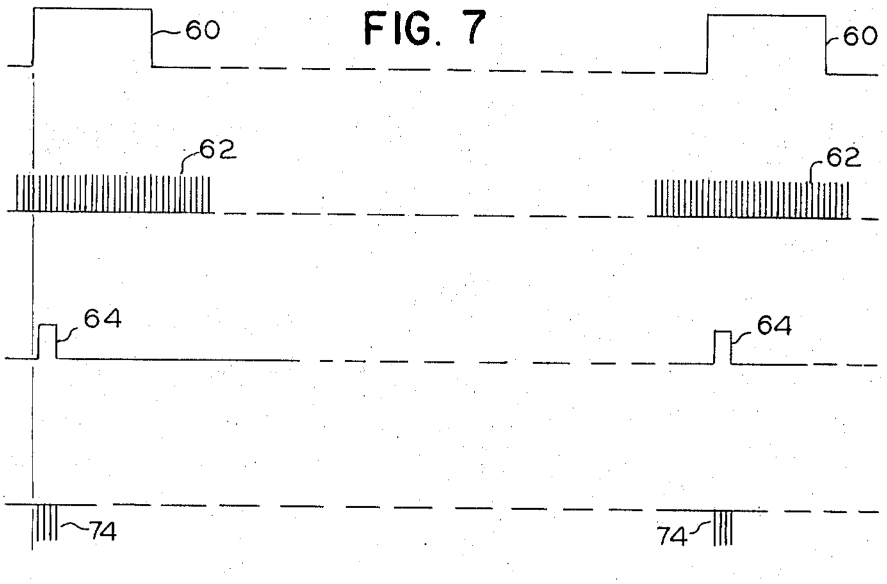
FIG. 7 is a waveform chart illustrating formation of input provided to vertical counter apparatus of the FIG. 1 circuit.

Referring to FIG. 7, a pair of vertical sync pulses 60 are illustrated with respect to master clock pulses indicated at 62. It is not intended the drawing of FIG. 7 accurately represent the number of master clock pulses occurring during a vertical sync pulse, the master clock frequency being quite high, but FIG. 7 illustrates, rather, the output produced by nand-gate 40 in response to synchronizer operation. Pulses 64 are illustrative of the output of synchronizer 50 on lead 52 and it is seen these pulses start upon the occurrence of the first master clock pulse after the start of a vertical sync pulse. The output pulse 64 on lead 52 remains high for the duration of four such master clock pulses in the illustration of FIG. 7, switch 54 being positioned for selection of the divide-by-four output of dividing circuit 38. Referring further to FIG. 6 illustrating the synchronizer in greater detail, the vertical sync pulse is applied to the clock input of JK flip-flop 66 which also receives an enable input at the J input from control flip-flop 68 in FIG. 1. When a vertical pulse occurs, JK flip-flop 66 is set to produce a Q output coupled to the J input of JK flip-flop 70. At the next master clock pulse received on lead 72 from switch 54, the JK flip-flop 70 is set to provide a Q output on lead 52, and two or four clock pulses later (according to the setting of switch 54) JK flip-flop 70 will be reset to provide a Q output. The Q output is connected for resetting flip-flop 66. Returning to FIG. 7, the resulting pulse 64 on lead 52 will enable nand-gate 40 for the two or four master clock pulses, and consequently, this number of master clock pulses as illustrated at 74 in FIG. 7 will appear at lead 58. Thus, for the occurrence of each vertical sync pulse, the selected number of master clock pulses will be applied as a counting input to vertical counter 76.

Vertical counter 76 is reset by the same flip-flop 68 that enabled synchronizer 50, while horizontal counter 36 is reset by horizontal sync pulses on lead 30. The outputs of horizontal counter 36 and vertical counter 76 are compared by comparison circuit 78, suitably comprising a number of exclusive-or function gates for comparing ten binary digit outputs of horizontal counter 36 with the ten binary digit outputs of vertical counter 76. The corresponding digits in the two counters are compared and when the total in the horizontal counter compares with or "crosses over" the total in the vertical counter, comparison circuit 78 provides a "strobe" output on lead 80. This action is more clearly visualized with the aid of the waveform chart of FIG. 8.

Figure 8:
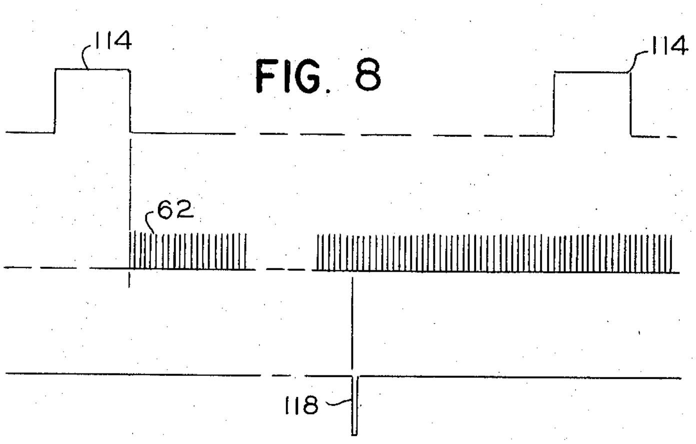
FIG. 8 is a waveform chart illustrating production of a strobe pulse in the FIG. 1 apparatus.

Referring to FIG. 8, at the conclusion of each horizontal sync pulse 114, master clock pulses 62 are applied to horizontal counter 36 via lead 116, the counter having been reset by the horizontal sync pulse. The horizontal counter 36 continues to count until it accumulates a total equaling that in vertical counter 76, at which time a strobe pulse 118 is generated on lead 80. As will hereinafter be more fully described, the strobe pulse will indicate arrival at a portion of a raster line which will be supplied as a "printout" input to processor 82. At the start of each raster line, horizontal counter 36 will have been reset, and horizontal counter 36 counts until the raster line portion or segment of interest is reached, causing a comparison to occur. Of course, the counter 36 counts on to the end of the horizontal raster line, at which time it is reset by the concluding edge of the horizontal sync pulse. For each horizontal raster line, a comparison will take place at a corresponding or aligned location relative to other raster lines, until an entire raster or field has been scanned, e.g., on the face of cathode ray tube 12. Then a vertical sync pulse occurs and synchronizer 50 causes nand-gate 40 to increment vertical counter 76 by two or four more counts. Consequently, during the next field a comparison will take place at a displaced or overlapping location along the horizontal raster lines. "Stripes" of information are thus supplied to processor 82 for application to web 100, successively different or displaced "stripes" being supplied as the paper moves past cathode ray tube 84.

The strobe output on lead 80 is applied as a resetting input to synchronous counter 42, the latter comprising four stages numbered 120, 122, 124 and 126, wherein the first two comprise divide-by-16 circuits or four stage counters, while the last two comprise divide-by-2 circuits. The last stage of each of the dividing circuits is connected as a "carry" input to the first stage of the next dividing circuit for providing a synchronous counter 42 capable of counting 512 binary bits. After the counter 42 is reset by strobe pulse 118, the same starts counting master clock pulses as received at dividing circuit 120 from Schmitt trigger circuit 34, the master clock also being employed as a clocking input for each of the dividing circuits of synchronous counter 42.

The first stage output of dividing circuit 122 is supplied as an input to nand-gate 128, while a second input for gate 128 is received as the divided output from dividing circuit 126. Consequently, the output of gate 128 will be "true" when the counter in effect reaches a count of 528 or 512 (represented by the output of dividing circuit 126) plus 16 (represented by the first stage output of dividing circuit 122). The output of the first stage of dividing circuit 122 is further applied as an input to nand-gate 130 via inverter 132, functioning to turn off the output of nand-gate 130 after 16 master clock pulses beyond the strobe pulse. Nand-gate 130 provides the "shift" input to a 16 bit shift register 134 which receives video or Z-axis information from Schmitt trigger circuit 136. Trigger circuit 136 receives the output of amplifier 22.

Strobe pulse 118 is also applied as a clock input to JK flip-flop 138 which is operable to produce a Q output applied to nand-gate 140 upon the occurrence of the strobe pulse. Nand-gate 140 further receives strobe pulse 118 and the master clock putput of Schmitt trigger circuit 34 such that the output of gate 140 is true, that is, a negative-going output results for each positive-going master clock as long as the Q output of flip-flop 138 is present and the strobe pulse 118 has concluded.

Figure 9:
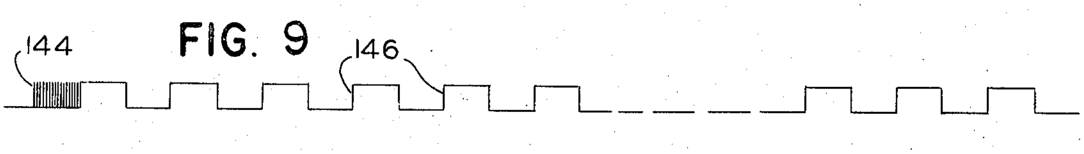
FIG. 9 is a waveform chart illustrating shift pulse inputs to the shift register of the FIG. 1 circuit.

The input to inverter 132 will be down for the first 16 counts of synchronous counter 42, and consequently the output of inverter 132 will be high during this period. The negative-going outputs of nand-gate 140 corresponding to the first 16 master clock pulses received at the input of gate 140 will cause 16 corresponding but positive-going pulses at the output of gate 130 (144 in FIG. 9) producing 16 shifts in shift register 134. Therefore, the video information as derived from Schmitt trigger circuit 136 will be digitized into the 16 stages of shift register 134. It will be noted that the strobe input is also provided to gate 140 in order to prevent generation of 17 shift pulses rather than 16.

At the conclusion of 16 counts by synchronous counter 42, the output of the first stage of divider circuit 122 will cause the output of inverter 132 to drop, thereby terminating the series of 16 pulses. Gate 140 will continue to supply pulse outputs corresponding to master clock pulses, but nand-gate 130 is in effect disabled and its output will go high for the 16 pulses while the output of inverter 132 is low. At the end of a 32-pulse count by synchronous counter 42, the second stage of divider circuit 122 resets JK flip-flop 138 by means of lead 142, thereby discontinuing the Q output of the JK flip-flop and causing the output of nand-gate 140 to remain in its normally high state, and master clock pulses at the input of gate 140 will be prevented from producing an output corresponding thereto. Each 16 clock pulses, the first stage of divided circuit 122 will shift the level of the output of nand-gate 130 for producing 16 long pulses (146 in FIG. 9) until the counter is subsequently disabled by gate 128. The 16 slower pulses shift information out of shift register 134. At the count of 528, allowing for 16 short shift pulses and 16 long shift pulse cycles, gate 128 disables the input of dividing circuit 120, with the entire contents of shift register 134 having been shifted out via lead 148.

The information shifted from shift register 134 is applied to the control grid 90 of tube 84 via amplifier 150 which also receives a disabling or blanking input from gate 128 after the 16 slow shifts of information from shift register 134. Furthermore, the output of gate 128 is applied to Miller integrator circuit 152 by way of inverter 154 such that the integrating capacitor 156 of the integrator is clamped by transistor 158 when the count 528 is reached by counter 42 and until counter 42 is reset by the next strobe pulse. When a strobe pulse occurs, all stages of counter 42 are reset to zero and Miller integrator 152 generates a short ramp which is applied to vertical deflection coil 94 by way of amplifier 160. The vertical sweep is about 0.2 inches in length and is arranged to make a relatively slow "vertical" excursion during the period of time shift register 134 delivers its output. As will be hereinafter more fully discussed, this output is thus slowly provided after the video information is inputted to shift register 134, and the output occupies at least a portion of the time between shift register inputs.

Referring more particularly to hard copy processor 82, cathode ray tube 84 is relatively flat in the vertical direction with the narrow edge thereof appearing in the drawing. The tube 84 includes a cathode 88 from which electron beam 86 is emitted through grid 90, as well as conventional beam accelerating structure not shown in detail. This particular tube is of the magnetically deflected variety having a deflection yoke including horizontal deflection coil 92 and a vertical deflection coil 94, by means of which electron beam 86 is deflected in the horizontal and vertical directions respectively. The electron beam is directed toward an elongated narrow phosphor screen 98 having its long direction perpendicular to the drawing. The phosphor becomes illuminated in the usual manner while electron beam impinges thereupon. Since the phosphor screen 98 is long and narrow, vertical deflection coil 94 is arranged to have a lesser effect than the deflection produced by horizontal deflection coil 92. It will be noted the "horizontal" and "vertical" deflection directions are reversed from tube 12.

Phosphor 98 is disposed on the inside of a fiber optic faceplate 96 including a multiplicity of substantially parallel fiber optic strands arranged in a direction axial of cathode ray tube 84. The fiber optic faceplate 96 delivers the fluorescent image produced by phosphor 98 directly onto a sensitive web 100, which in practice may be disposed substantially against fiber optic faceplate 96 for accurate exposure. The material 100 may comprise 3M type 777 dry silver paper manufactured by Minnesota Mining & Manufacturing Co. However, other types of sensitive material may be employed. During operation of the apparatus, this paper is drawn past faceplate 96 from the container 102 which stores a roll of such paper. The elongated dimension of faceplate 96 corresponds approximately to the width of paper web 100.

While light-sensitive and heat-developed paper has been found to be of advantage in establishing a final permanent copy according to the present invention, it will be apparent that other recording media may be substituted therefor. The surface of means 100 receiving the image from cathode ray tube 84 may alternatively transfer an image received therefrom onto another web or sheet of material employed for the final copy.

The paper web 100 is pulled past faceplate 96 by means of clutch operated rollers 104 and 106, at least one of which continuously turns for drawing the paper in the direction indicated by the arrow in FIG. 1. Thus, for example, roller 106 continuously turns in a clockwise direction, and roller 104 is operated upwardly by means of a clutch whereby paper 100 is frictionally engaged between the rollers and pulled to the left. When roller 104 is thus operated, a switch S is energized, such switch being connected to place flip-flop 68 in a state for enabling synchronizer 50 and initiating operation of the circuitry hereinbefore described. Thus the circuitry operation is coordinated with the mechanical operation of processor 82, which mechanical operation is initiated by means not shown. The paper after leaving the aforementioned rollers then proceeds under clutch operated cutter 108 and around guide 110 by which it is directed under continuously operating roller 112 between roller 112 and heating means 114. The sensitive paper. Hereinbefore designated as an example of a sensitive web material, is developed by raising the temperature thereof with means 114. Cutter 108 functions to sever the web into individual sheets of paper, each providing a reproduction of the image being displayed on cathode ray tube 12.

Cathode ray tube 84 comprises advantageous scanning means for the copying apparatus according to the present invention. However, other structures may be employed. For instance, the electron beam may be directly applied to a charge-sensitive web.

The strobe output from comparison circuit 78 is applied via inverter 162 as an input to nand-gate 164 in conjunction with the horizontal sync signal on lead 30. When the strobe output pulse 118 overtakes the horizontal sync pulse, nand-gate 164 is operated for resetting flip-flop 68 to a condition wherein vertical counter 76 is reset and synchronizer 50 is no longer enabled.

Figure 2:
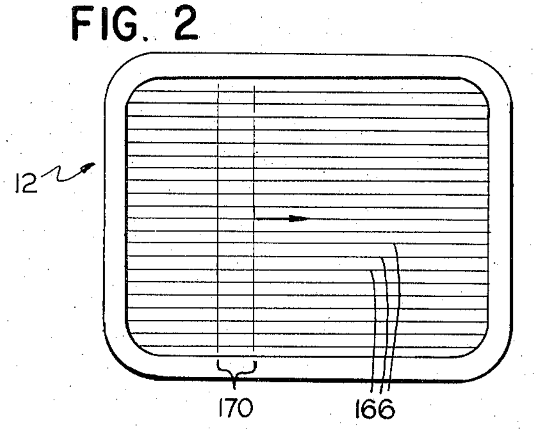
FIG. 2 is an elevation of a refreshed cathode ray tube display.

Operation of the present invention as thus far described will be explained with the aid of FIGS. 2, 3 and 10. FIG. 2 represents the face of a conventional cathode ray tube, for example cathode ray tube 12 in FIG. 1, wherein a multiplicity of horizontal lines 166 illustrate a conventional raster of the TV type. It is understood the raster lines will be provided with intensity information for completing a display comprising output and/or input information from or to the computer with which terminal 10 is associated. Information may be oriented in either X or Y direction on the CRT face.

Figure 3:
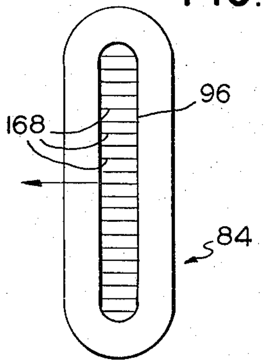
FIG. 3 is an elevation of a display adapted for exposing sensitized material in the production of hard copy output.

FIG. 3 represents the faceplate 96 of the cathode ray tube 84, suitably comprising a fiber optic faceplate. The scanning or raster lines 186 are disposed across the narrow dimension of the tube screen rather than lengthwise as in prior systems, with these scanning or raster lines 168 corresponding to segments of lines 166 in FIG. 2. Thus, the electron beam 86 of tube 84 scans the short distance across the faceplate, and is deflected slowly with respect to the long dimension of the faceplate whereby a scan is displaced relative to the previous scan.

In the present method and apparatus, the short scans 168 correspond to a "slice" or "stripe" 170 of the field raster provided in tube 12. If only the area 170 in FIG. 2 is considered, it can be seen that it consists of a number of short line segments displayed at the horizontal repetition rate of the system, and stepped across the viewing area by the vertical scan. After a vertical scan, the slice or stripe is then "moved" in the direction indicated by the arrow in FIG. 2 whereby the information appearing on faceplate 96 of cathode ray tube 84 in FIG. 3 sequentially represents all portions of the entire FIG. 2 field. Under ordinary circumstances, the information presented by cathode ray tube 12 will remain constant during such operation, i.e., representing a received computer readout. In accordance with the first described embodiment of the present invention, black and white information is involved such as alphanumeric representations rather than a gray scale image.

The arrow in FIG. 3 represents the direction of movement of the paper web relative to faceplate 96. The movement of the "slice" or "stripe" in the direction of the horizontal scanning lines is substantially coordinated with the movement of the paper web to provide the best reproduction, the successive images provided upon the screen of cathode ray tube 84 suitably overlapping to a considerable extent as will be further explained with reference to FIG. 10.

Figure 10:
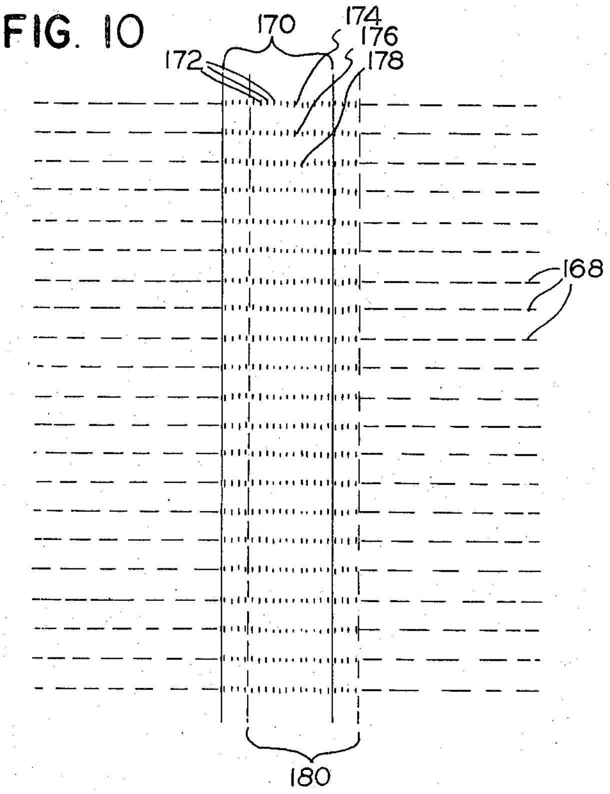
FIG. 10 is a detailed and explanatory illustration of a raster presentation for a tube employed in exposing a sensitized web in accordance with the present invention.

Referring to FIG. 10, an enlarged raster is illustrated which again comprises line segments 168, corresponding to the initial FIG. 2 "stripe" indicated at 170. Considering one of the line segments, the display information contained in the segment is digitized into 16 bits by Schmitt trigger 136 and shift register 134 in FIG. 1, and these 16 bits are schematically indicated by a series of dots 172 in FIG. 10 for a particular line segment 174. As shift register 134 is emptied during "vertical" scanning of cathode ray tube 84, these 16 digit positions along the vertical scan will either be illuminated or not illuminated according to the information outputted from the shift register. The apparatus operates on the next cycle to fill the shift register with digitized information from the aligned portion of the next scanning line segment of the field, i.e., segment 176, and the lines are thus scanned sequentially until an entire "stripe" has been illuminated. Thus, line segment 174 is scanned, then line segment 176, and then line segment 178, etc., with a slow "horizontal" scan providing the separation between segments in tube 84. After the completion of the scanning of the entire stripe, the stripe selected is moved in the direction indicated by the arrow in FIG. 2 to the location bounded by dashed lines and indicated at 180 in FIG. 10. It will be noted that the stripe 180 is displaced to the right by approximately four digit positions, corresponding to a position of switch 54 in FIG. 1 for selecting the divide-by-4 output of divider 38. The successive line segments of information are now again provided in the "vertical" direction across the faceplate of cathode ray tube 84 wherein the successive line segments correspond to aligned information of the input raster of FIG. 2 but displaced for substantially matching movement of web 100. It will be understood that the dividing circuit 38 can be designed to provide a greater or lesser degree of overlap as desired for matching various conditions of web movement. Also, of course, the shift register 134 can provide a greater or lesser number of digital storage bits, but with the overlap characteristic desirably being retained.

According to an important feature of the present invention, the information which provides the successive raster line segment traces in the "vertical" direction on the faceplate of cathode ray tube 84 is not provided to tube 84 at the same rate as the information is received from the terminal, nor the rate at which this information is supplied to cathode ray tube 12. Rather, he information is received during the short "stripe" interval for each raster line, i.e., as the same is written on tube 12 in FIG. 2, the information is stored, and then the electron beam 86 of tube 84 is slowly scanned in a "vertical" direction, writing the same information during the extended period of time before the next line segment is traced and received from terminal 10.

Assume the operation of processor 82 has been started by operation of the clutch associated with roller 104. Switch S places flip-flop 68 in a state providing a J input to the first flip-flop of the synchronizer 50. At the reception of the next vertical sync pulse, either directly from terminal 10 or as separated from the video signal, synchronizer 50 will provide an output pulse which is either two or four master clock pulses long, according to the setting of switch 54. This pulse indicated at 64 in FIG. 7, enables master clock pulses received on lead 56 from Schmitt trigger 34, and supplies a series of four such pulses (74 in FIG. 7) on lead 58 as a counting input to vertical counter 76. A count is stored in counter 76 for the duration of a whole field, i.e., from one vertical sync pulse to the next. During the period between vertical sync pulses, Miller integrator 44 applies a relatively slow "horizontal" sweep signal to horizontal deflection coil 92 via amplifier 46.

Horizontal counter 36 counts the master clock pulses between horizontal sync pulses and is reset by the conclusion of each horizontal sync pulse. At the very start of the operation, the contact of vertical counter 36 will be zero, and consequently the initial zero content of horizontal counter 36 will compare with the content of the vertical counter and comparison circuit 78 will produce a strobe 118, at the start of each raster line 166 in FIG. 2, that is, at the left-hand side thereof, until he next vertical pulse appears at the end of the field. Consequently, tube 84 will for a short time display a "stripe" 170 which will correspond to information at the extreme left-hand side of the FIG. 2 raster display. When the first vertical sync pulse is received, the content of horizontal counter 36 will not compare with the content of the vertical counter until two or four master clock pulses have been counted by counter 36, according to the setting of switch 54. Thus, the stripe 170 in FIG. 2 will move slightly to the right as indicated by the dashed line position 180 in FIG. 10. With each ensuing input field, the horizontal counter must attain a slightly higher count content before comparison is made with the incremented total in he vertical counter, and consequently aligned line segments in the raster will be produced incrementally farther to the right, in each instance initiated according to the production of the strobe pulse 118 as comparison circuit 78 detects the "crossover." Meanwhile, of course, paper 100 moves past the faceplate 96 to receive the image.

As strobe pulse 118 is produced, synchronous counter 42 is reset and automatically starts counting master clock pulses from Schmitt trigger 34. The strobe pulse also sets flip-flop 138 to provide a Q output and gate 140, receiving master clock pulses, provides an output of 16 such pulses, starting after strobe pulse 118. These 16 strobe pulses appear at the output of gate 130, since the remaining input thereof is enabled because of the zero state of the first stage of counter dividing circuit 122. These 16 pulses (144 in FIG. 9) shift Z-axis information from amplifier 22 into shift register 134, digitizing such information during the reception of one of the short horizontal line segments which make up a "stripe" 170, 180, or the like. The entire segment, e.g., one of the line segments 174, 176, or 178 in FIG. 10, will now be stored in the 16 stages of the shift register. Meanwhile, after counter 42 has counted 16 master clock pulses, the output of gate 130 is shifted positively for 16 clock pulses producing a pulse equal in length to 16 clock pulses, and is then shifted negatively for the duration of 16 clock pulses, this sequence being repeated 16 times for providing 16 "long" shift pulses for application to shift register 134. The digitized information for one of the lines such as 174, 176 or 178 is shifted out and applied to the control grid 90 of cathode ray tube 84 at the slower rate and before the next aligned line segment is ready for reception at the input end of shift register 134. After 16 such "long" shift pulses, gate 128 disables the counter 42 from further counting until the same is reset by the next strobe pulse. During the period between outputs from gate 128, i.e., during operation of shift register 134, Miller integrator 152 provides a relatively slow, relatively short, vertical scan for application to vertical deflection coil 94 via amplifier 160. Therefore, successive digitized outputs from shift register 134 are properly displaced in order along the vertical scans on the faceplate of cathode ray tube 84. Between shift register operations, that is, after the last slow digitized output from shift register 134, and until the next aligned raster segment is reached in the input information, the Miller integrator 156 is clamped by the output of gate 128.

Eventually, the strobe "passes" a horizontal sync pulse, i.e., as the left-hand edge of the "stripe" reaches the right-hand side of the raster display illustrated in FIG. 2. This crossover is detected by gate 164 which resets the flip-flop 68 in turn resetting vertical counter 76 to zero and disabling synchronizer 50. The clutch associated with roller 104 is suitably stopped a short time later, and cutter 108 is operated whereby to provide a separated "hard copy" of the information displayed. The paper is "developed" by heating means 114 and is delivered in the direction indicated by the arrow at the right of roller 112. The operation of cutter 108 and the retracting of roller 104 can be controlled by manual switching (not shown) or may be controlled automatically from the reset of flip-flop 68.

The system operation wherein the input information is stored and then "played back" at a slower rate has the advantage of not requiring the extremely high level of brightness which would be required if cathode ray tube 84 were scanned vertically at the same rate as tube 12 is scanned horizontally. Moreover, the axis of cathode ray tube 84 is modulated at a much slower rate than the video input signal rate, which is typically about 10 megahertz. The slower scan employed is much more compatible with the operation of the fiber optic faceplate copying tube 84 than would be the case if high brightness were required and the higher frequency video frequency Z-axis modulation were required. Tube construction, operating life, and expense are desirably affected relative to the production of a good hard copy.

The display on the faceplate 96 of cathode ray tube 84 is "changed" at a rate substantially equal to the rate of paper movement, and the paper 100 is exposed to the display information at a higher rate than if only a single horizontal line at a time were scanned (i.e., if the display were turned by 90 degrees). Conventionally, one horizontal line at a time from the raster depicted in FIG. 2 would have been provided along the long dimension of faceplate 96 in FIG. 3, but such raster line would be detected during one input field, the next raster line being detected (and displayed) during the next input field, and so on. The information available at the CRT 84 would be slower to a degree and moreover the problems of high bandwidth Z-axis modulation and high brightness are present. Although storage means may be employed in accordance with the present invention for retaining a complete horizontal line between fields and playing the same back at a slower rate, such a storage means would have to store a great many more bits. Therefore, the system of the illustrated embodiment is preferred wherein scanning is perpendicular to the short width of the faceplate of tube 84 and short line segments are stored and then "played back" at a slower rate. Furthermore, the latter method exposes an area of the paper of significant width, i.e., across substantially the width of the fiber optic faceplate, as opposed, for example, to a single line width at a time. Although several horizontal lines at a time could be inputted, stored, and "played back" at a slower rate in accordance with the present invention, the storage capacity required is then even greater, and therefore the system of storing the short horizontal line segments is again preferred.

The embodiment as hereinbefore described relates to the hard copy presentation of "black and white" or bistable information such as alphanumeric characters, line drawings, or the like. Gray scale or half-tone information is also readily reproduced on hard copy employing the modification illustrated in FIGS. 4 and 5. These figures illustrate a "video channel" which in part replaces the video channel from lead 14 to amplifier 22 and Schmitt trigger 136 in FIG. 1.

Figure 4:
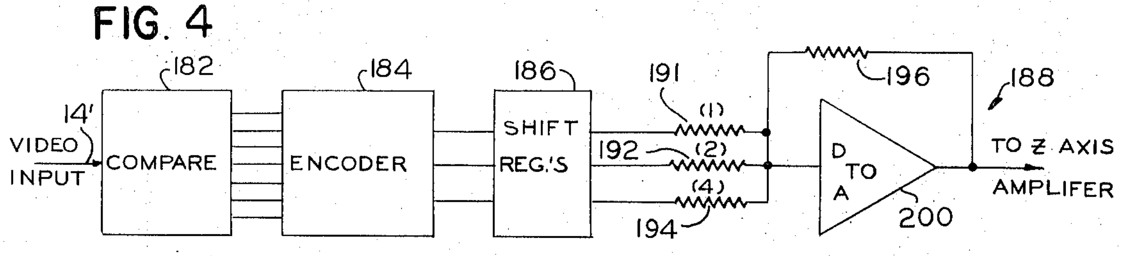
FIG. 4 is a block diagram of circuitry adapting the FIG. 1 circuit to gray scale hard copy output.

Referring to FIG. 4, the video input, indicated at 14', is applied to a comparison circuit or video slicer 182 which provides outputs on a number of leads according to the amplitude of the video input. Thus, if the video signal is small in amplitude, only one of the output leads of comparison circuit 182 may be energized, while if the amplitude is higher a larger number of such output leads may be energized indicating the level of the input signal. These outputs are encoded by encoder 184 to express the output level in binary fashion for application to shift registers 186 wherein one shift register is provided for each binary information bit. The input information for the shift registers is shifted in and shifted out in the same manner as hereinbefore in connection with FIG. 1, i.e., the information is shifted in from encoder 184 on a "real time" basis, and shifted out at a slower rate. The shift register outputs are then applied to a digital-to-analog converter generally referred to by reference numeral 188 including a high gain amplifier 200 receiving the shift register outputs via resistors 191, 192 and 194, respectively. The high gain amplifier 200 is also provided with feedback resistor 196. The resistor 191 receives the output of a first shift register which conveniently represents the first or lowest order binary digit, while resistor 192 receives the shift register output representative of the next higher order binary digit, and resistor 194 receives the output representative of the highest order binary digit. The resistors 191, 192 and 194 suitably have values in inverse relation to the aforementioned binary digits, i.e., the resistance of resistor 192 is half that of resistor 191, while the resistance of resistor 194 is one-fourth that of resistor 191.

As can be seen from the above, the amplitude level of the video input signal is encoded whereby the information in the shift registers will represent such amplitude level, as the input information is shifted into the shift registers. Then, when the information is shifted out at a slower rate, the information, so far as amplitude is concerned, is reconverted to an analog level before application to amplifier 150 in FIG. 1.

Figure 5:
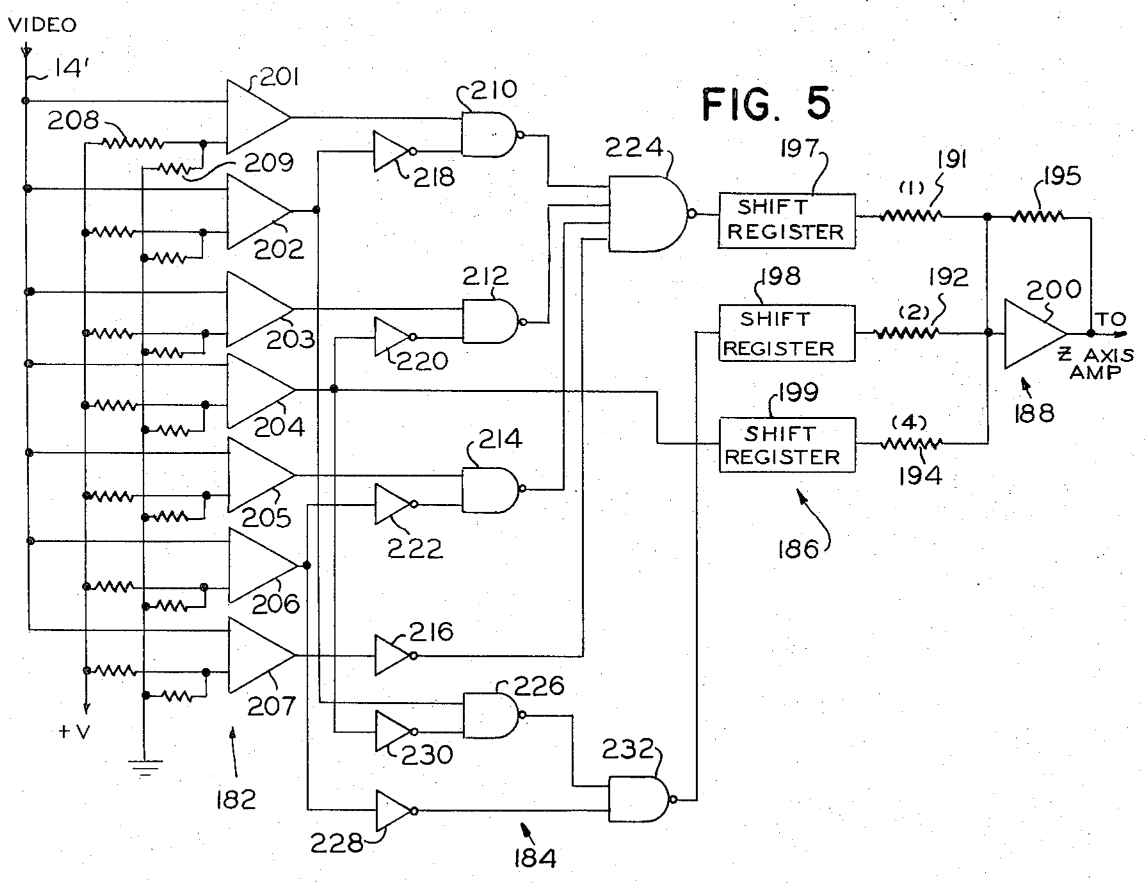
FIG. 5 is a schematic diagram illustrating the FIG. 4 circuit in greater detail.

Referring particularly to FIG. 5, the FIG. 4 circuit is illustrated in greater detail. The comparison circuit 182 suitably comprises a plurality of differential amplifiers, 201 through 207, each provided with an input voltage divider connected between a positive voltage and ground, with each voltage divider's center tap connected to one of the differential amplifier inputs. The video input 14' is applied to the remaining input of each of the amplifiers. Resistors 208 and 209, forming the first voltage divider, have a resistance ratio such that amplifier 201 will be activated by a fairly low video amplitude level. Thus, the resistance of resistor 208 is typically appreciably greater than that of resistor 209. The successive amplifiers, 201 through 207, have input voltage dividers wherein the ratio of resistance permits each consecutive amplifier to be energized by a slightly higher amplitude input signal, whereby the amplifiers 201 through 207 turn on consecutively as the video input amplitude changes from zero to maximum. At the maximum value video input, all amplifiers will be energized. The amplifiers 201 through 207 then correspond to amplitude levels of one through seven.

The encoder 184 comprises a plurality of gates for coding the levels indicated by the amplifier outputs into binary form. Nand-gates 210, 212 and 214, respectively, receive the outputs of amplifiers 201, 203 and 205, while the outputs of amplifiers 202, 204 and 206 are applied to the same nand-gates through inverters 218 to 220 and 222, respectively. The outputs of nand-gates 210, 212 and 214, as well as the output of inverter 216 driven by amplifier 207, are applied as inputs to nand-gate 224 driving a first or lower order shift register 197. The next higher order shift register 198 receives the output of nand-gate 232. Amplifier 206 drives nand-gate 232 via inverter 228, and a nand-gate 226 receives one input from amplifier 202 and a second input from amplifier 204 via inverter 230, and supplies a remaining input to nand-gate 232. The third or highest order shift register 199 receives the output of amplifier 204.

The nand-gates 210, 212 and 214 as well as inverter 216 have a down-going output in the case of odd numbered amplifier outputs being energized, but the output of nand-gate 224 drops for even numbers inasmuch as the nand-gates 210, 212 and 214 are switched by inverters 218, 220 and 222. Thus, binary one digits are inputted to shift register 197. Nand-gate 226 provides an output causing the output of nand-gate 232 to be up when the amplifier 202 provides an output. The condition holds until a level is reached whereby amplifier 204 is energized and then this nand-gate 226 output is disabled. If the output of amplfier 206 is high, inverter 228 provides an input to nand-gate 232 causing the latter's output to be high. It will be seen that inputs will be provided to shift register 198 when the outputs of amplifiers 202, 203, 206 and 207 are up, corresponding to binary digits 2, 3, 6 and 7. The remaining shift register, 199, receives its input from amplifier 204 indicative of the binary bit 4. The remainder of the circuit converts the shift register outputs to an analog level as hereinbefore indicated.

Thus, the circuitry according to the present invention can adequately provide a gray scale output for application to the hard copy processor, with the degree of fidelity of reproduction being dependent upon the number of encoding levels chosen. It will be appreciated that the particular memory means here illustrated for either bistable or gray scale storage is by way of illustration, and although preferred, other memory means may alternatively be utilized.

While we have shown and described several embodiments of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

1. Apparatus for providing a copy of electronically received input information, said information comprising an electronic input representative of a raster presentation, said apparatus comprising:

means for receiving said input information and for successively storing at least first portions of said information separated by longer portions, said first portions corresponding to aligned raster line segments, said storing means comprising shift register means, copying apparatus for reproducing information on a surface adapted to provide a permanent copy thereof, including means for scanning locations on said surface with only the stored first portions, at a slower rate than said information was initially received, for successively intercepting points on said surface with the information, said scanning means comprising electron beams scanning means, means for producing relative movement between said surface and said scanning means, means for receiving sync pulses related to orthogonal scanning directions of said raster presentation, means for generating clock pulses, first counter means for counting clock pulses during a raster line, second counter means and means for incrementing said second counter means for each raster field, means for comparing the count in said first and second counter means and for generating a strobe output when a substantial comparison is achieved.

means for shifting information into said shift register in response to said strobe output, and means for shifting information out of said shift register at a slower rate substantially between strobe outputs and including means for applying the information shifted out of said shift register to said scanning means.

2. The apparatus according to claim 1 wherein said scanning means comprises a cathode ray tube having a faceplate adjacent said surface with a long dimension extending across said surface and a short dimension in the direction of relative movement, said cathode ray tube having first deflection means for deflecting the electron beam thereon in a first direction across the short dimension of the faceplate as information is shifted out of said shift register, and scanning means for scanning said electron beam along the long dimension of said faceplate between sync pulses indicative of the start and finish of a raster field.

3. Apparatus for providing a copy of electronically received input information comprising:

means for receiving said input information and for successively storing at least first portions of said information separated by longer portions, copying apparatus for reproducing information on a surface adapted to provide a permanent copy thereof, including means for scanning locations on said surface with only the stored first portions, at a slower rate than said information was initially received, for successively intercepting points on said surface with the information, means for producing relative movement between said surface and said scanning means, said storing means comprising a shift register including means for shifting said information into said shift register at a first rate as said information is received and means for shifting information on out of said shift register and controlling said scanning means therewith at a slower rate between the times when information is stored, additional shift registers and means for encoding the amplitude level of said information according to a binary code, separate shift registers representing separate binary digits of said binary code, and digital-to-anglog converter means interposed between the output of said shift registers and said scanning means.

4. The method of producing a substantially permanent copy of input information on an image-receiving surface wherein he input information corresponds to an input raster including successive lines of information, said method comprising:

receiving, at a given rate, the input information corresponding to successive raster lines, successively storing first portions of said received information, wherein said portions stored comprise raster line segments, each segment being of such length as to convey a variation in the value of such input information along such segment, said segments having interrelated locations in successive raster lines, said segments being a smaller proportion of the said raster lines than the remainder thereof not including said segments, and scanning said image-receiving surface at a second and slower rate, while controlling said scanning to provide an image on the image-receiving surface corresponding to the said first portions of stored information without then immediately forming an image corresponding to said remainder to the raster lines, moving said image-receiving surface in the direction of the raster lines, and successively storing further portions comprising raster line segments and scanning said image-receiving surface while controlling the scanning to provide an image corresponding to said further portions of said received information, wherein said further portions are displaced from said first portions along said raster lines corresponding to movement of said image-receiving surface.

5. The method according to claim 4 including scanning with an electron beam and controlling the electron beam intensity with information portions comprising raster line segments aligned across the raster.

6. The method according to claim 4 wherein said raster line segments are relatively longer than the degree of movement of said image-receiving surface before the scanning of said image-receiving surface with said further portions, said further portions having content corresponding to part of said first portions to provide an overlap of information.

7. The method according to claim 6 including digitally encoding said information comprising said portions of said raster lines, wherein said further portions include part of the digital information of said first portions shifted in digital order, providing the overlap of information.

8. Apparatus for providing a copy of electronically received input information, said information comprising an electronic input representative of a raster presentation, said apparatus comprising:

means for receiving said input information in the form of raster lines and for successively storing first portions of said raster lines corresponding to aligned raster line segments across a raster, each segment being of such length as to convey a variation in the value of such input information along such segment, and wherein each segment comprises a smaller proportion of a raster line than the remainder thereof not including said segment, copying apparatus for reproducing information on a surface adapted to provide a permanent copy thereof, including means for scanning locations on said surface with the stored first portions excluding the remainder of said raster lines, at a slower rate than said information was initially received, for successively intercepting points on said surface with the information, said scanning being in the direction of said raster lines, means for producing relative movement between said surface and said scanning means in the direction of said raster lines, and means for changing the portions stored by said means for storing in a direction along said raster lines so that said image-receiving surface receives at least partially differing portions of said information corresponding to said raster as relative movement between said surface and said scanning means takes place.

9. The apparatus according to claim 8 wherein said scanning means scans a said location after a first portion is stored and between times when said first portions are stored.

10. The apparatus according to claim 8 wherein said scanning means comprises electron beam scanning means.

11. The apparatus according to claim 8 wherein the at least partially differing portions include part of said first portions to provide an overlapping presentation for reproducing information on said surface.

12. The apparatus according to claim 8 wherein said storing means comprises a shift register including means for shifting information into said shift register at a first rate as information is received and means for shifting information out of said shift register and controlling said scanning means therewith at a slower rate between the times when information is stored.

13. The apparatus according to claim 8 wherein said scanning means comprises a cathode ray tube having a faceplate adjacent said surface with a long dimension extending across said surface and having a short dimension in the direction of said relative movement, said cathode ray tube having a first deflection means for deflecting the electron beam thereof in a first direction across the short dimension of the faceplate to record said segments, and second deflection means for deflecting the electron beam of the cathode ray tube in a second direction along the long dimension of said faceplate during a raster field.

* * * * *

UNITED STATES PATENT OFFICE
CERTIFICATE OF CORRECTION

Patent No. 3,811,007 Dated May 14, 1974

Inventor(s) PETER J. UNGER and HARRY L. FORD

It is certified that error appears in the above-identified patent and that said Letters Patent are hereby corrected as shown below:

Column 4, line 31, "Q" (both occurrences) should be --$\bar{Q}$--;

Column 5, line 54, "putput" should be --output--;

Column 7, line 50, "The sensitive paper. Hereinbefore" should be --The sensitive paper, hereinbefore--;

Column 8, line 14, "186" should be --168--;

Column 9, line 60, "contact" should be --content--;

line 64, "he" should be --the--;

Column 10, line 11, "he" should be --the--;

Column 14, line 29, claim 2, line 7, "thereon" should be --thereof--;

line 68, claim 4, line 3, "he" should be --the--;

Column 15, line 19, claim 4, line 22, "remainder to" should be --remainder of--; and Column 16, line 48, claim 13, line 6, before "first" delete "a".

Signed and sealed this 29th day of October 1974.

(SEAL)
Attest:

McCOY M. GIBSON JR.
Attesting Officer

C. MARSHALL DANN
Commissioner of Patents